Nov. 24, 1964  R. P. ALEXANDER ETAL  3,158,656
ORGANOBORON ALCOHOLS AND THEIR PREPARATION
Filed April 28, 1959
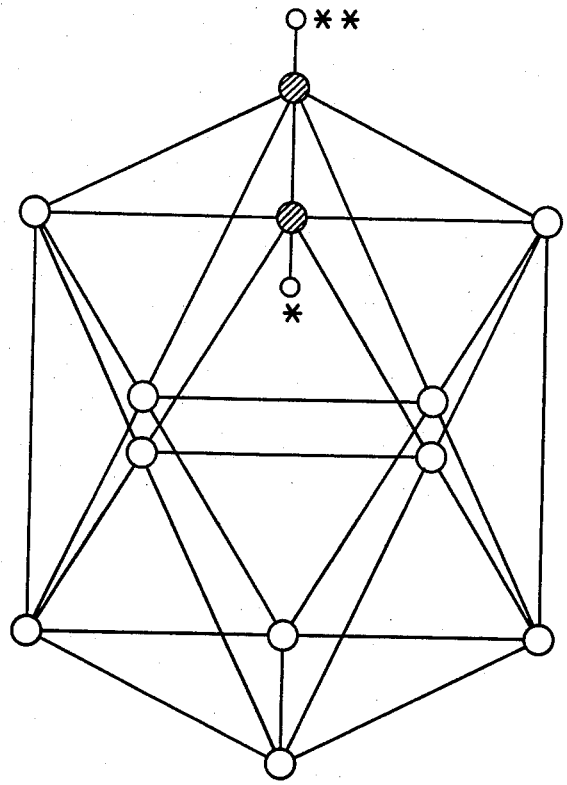
○   BORON
◉   CARBON
○   HYDROGEN ON CARBON
    (HYDROGEN ATOMS ON BORON
    OMITTED FOR CLARITY)
INVENTORS
ROY P. ALEXANDER
BY THEODORE L. HEYING
Adams Forward and McLean
ATTORNEYS United States Patent Office 3,158,656
Patented Nov. 24, 1964

3,158,656
ORGANOBORON ALCOHOLS AND THEIR PREPARATION
Roy P. Alexander, Lewiston, and Theodore L. Heying, Tonawanda, N.Y., assignors to Olin Mathieson Chemical Corporation, a corporation of Virginia
Filed Apr. 28, 1959, Ser. No. 809,570
7 Claims. (Cl. 260—606.5)

This invention relates to organoboron alcohols and to a method for their preparation. The organoboron alcohols are prepared by reacting successively with an alkali metal alkyl or aryl, a 1,2-alkylene oxide, and water, a compound of the class R R' $B_{10}H_8$(CR"CR''') wherein R and R' are each selected from the class consisting of hydrogen and an alkyl radical containing from one to five carbon atoms, wherein R" and R''' are each selected from the class consisting of hydrogen, an alkyl radical and a monoalkenyl hydrocarbon radical, at least one of R" and R''' being hydrogen, and the total number of carbon atoms in R" and R''' taken together not exceeding eight.

Compounds of the above class can be prepared by the reaction of decaborane or an alkylated decaborane having one to two alkyl groups containing 1 to 5 carbon atoms in each alkyl group with an acetylenic hydrocarbon containing from two to ten carbon atoms in the presence of a wide variety of ethers, nitriles or amines. The preparation of these compounds is described in application Serial No. 741,976, filed June 13, 1958, of Ager, Heying and Mangold, and now abandoned. For example, $B_{10}H_{10}$(CHCH) can be prepared by reacting for about 12 hours at 125° C. a mixture of decaborane and tetrahydrofuran in an autoclave pressure to 100 p.s.i. with acetylene.

The preparation of decaborane is known in the art. Lower alkyl decaboranes such as monomethyldecaborane, dimethyldecaborane, monoethyldecaborane, diethyldecaborane, monopropyldecaborane and the like, can be prepared, for example, according to the method described in U.S. Patent No. 2,999,117, issued September 5, 1961, on applicaton Serial No. 497,401, filed March 28, 1955, by Elmar R, Altwicker, Alfred B. Garrett, Samuel W. Harris and Earl A. Weilmuenster.

The solid products prepared in accordance with the method of this invention, when incorporated with suitable oxidizers such as ammonium perchlorate, potassium perchlorate, sodium perchlorate, ammonium nitrate and the like, yield solid prepellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The liquid products of this invention can be used as fuels according to the method described in the above application Serial No. 497,407. A major advantage of these new liquid products is the high stability they exhibit at elevated temperatures. One of the shortcomings of many high energy fuels is their limited stability at the high temperatures sometimes encountered in their use. The liquid products prepared by the method of this invention, however, exhibit relatively little decomposition even after having been maintained at elevated temperatures for extended periods, thus rendering them well suited for more extreme conditions of storage and use. The liquid products of this invention are also of high density.

In accordance with the present invention, it was discovered that compounds of the above class can be reacted successively with an alkali metal alkyl or aryl, a 1,2-alkylene oxide and water to produce organoboron alcohols.

The preferred alkali metal alkyls are the lithium alkyls such as methyl lithium, ethyl lithium, isopropyl lithium, n-propyl lithium, n-butyl lithium, sec-butyl lithium, t-butyl lithium, n-amyl lithium and the like, since they are soluble in inert organic solvents. Other alkali metal alkyls, such as the sodium and potassium alkyls can, however, also be employed as can the alkali metal aryls including phenyl lithium.

The 1,2-alkylene oxides useful in the invention include ethylene oxide, propylene oxide, butylene oxide, styrene oxide, octylene oxide and the like.

The ratio of reactants can be varied widely, generally being in the range of 0.1 to 10 moles of alkali metal alkyl per mole of organoboron compound, 0.1 to 20 moles of 1,2-alkylene oxide per mole of organoboron compound and 0.1 to 20 moles of water per mole of organoboron compound. The ratio of reactants is preferably in excess of stoichiometric. The reaction temperature can vary widely, generally from —90° to 80° C. and preferably from —20° to 30° C. The reaction pressure can vary from subatmospheric to several atmospheres, i.e. from 0.2 to 20 atmospheres, although atmospheric pressure reactions are convenient. The reaction is extremely rapid and addition of 1,2-alkylene oxide generally requires about onetenth to 2 hours, depending upon the ratio of reactants, the particular reactants and solvents employed, and the temperature and pressure of the reaction.

The process of the invention is illustrated in detail by the following examples.

*Example I*

4.5 g. (0.0312 mole) of $B_{10}H_{10}$CHCH were dissolved in approximately 100 ml. of diethyl ether. A solution of butyl lithium was prepared in the standard manner from 17.5 g. (2.5 moles) of lithium and 137 g. (1.0 mole) of n-butyl bromide in ether. The total volume of liquid at the end was 610 ml. which contained 0.0032 mole of butyl lithium per ml. of analysis. 47 ml. of this butyl lithium solution were added, equivalent to 2 moles of the $B_{10}H_{10}$CHCH used. The mixture was stirred for one-half hour and 3.1 g. (0.069 mole) of ethylene oxide in 10 ml. of diethyl ether were added. Vigorous reaction occurred and a white solid formed. About 25 ml. of water were added and the mixture was extracted with approximately 150 ml. of diethyl ether. The ether solution was dried over $MgSO_4$ which was removed by filtration. The ether was poured into an equal volume of pentane and white needles precipitated and were removed by filtration. The white solid product weighed 3.3 g., a yield of 45 percent, and had a melting point of 115° to 117° C. The crude product was redissolved in ether and again crystallized by adding that solution to an equal volume of pentane. The precipitate was removed and dried under vacuum at 65° C. for 2 hours. The melting point of this purified product was 123.5° to 125° C. uncorrected.

| Anal. | Calculated for $B_{10}H_{10}$[C(CH$_2$CH$_2$OH)]$_2$ | Found |
| --- | --- | --- |
| B | 46.6 | 45.1, 44.8 |
| C | 31.0 | 31.0, 30.6 |
| H | 8.6 | 8.64, 9.06 |

*Example II*

55.8 g. (0.39 mole) of $B_{10}H_{10}$CHCH in 100 ml. of diethyl ether were added at 0° C. to 0.852 mole of butyl lithium in 600 ml. of diethyl ether. After one-half hour at 0° C., 65 ml. (1.31 moles) of ethylene oxide were slowly added at —20° C. The mixture then was hydrolyzed with water at 0° C. The ether layer was separated, dried with MgSO₄, and poured into an equal volume of pentane. The resulting solid precipitate was filtered out. More pentane was added and a much smaller amount of precipitate formed and was filtered out. The total solid product obtained was 90.8 g. (0.39 mole) with a melting point of 114° to 117° C., which indicated it was $B_{10}H_{10}[C(CH_2CH_2OH)C(CH_2CH_2OH)]$.

The reaction can be carried out in inert solvents other than the diethyl ether employed in the specific examples. Such solvents include dimethyl ether, diethyl ether, methyl ethyl ether, dissopropyl ether, di-n propyl ether, ethyl n-butyl ether, ethylene glycol dimethyl ether, dioxane and tetrahydrofuran.

The compound of the formula $$B_{10}H_{10}[C(CH_2CH_2OH)C(CH_2CH_2OH)]$$

prepared as described in Examples I and II has the same structural formula as shown in the accompanying drawing with the exception that the hydrogen atoms indicated by each of the single and double asterisk are replaced by the radical $-CH_2CH_2OH$.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter initimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight base upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnel and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of these types is a device in which air is compressed and fuel is then burned in a combustor in admixture with the air. Following this, the products of combustion are expanded through a gas turbine. The liquid products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuel presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool off sufficiently the products of combustion before they enter the turbine so that they do not damage the turbine. Present-day turbine blade materials limit the turbine inlet temperature to approximately 1600° to 1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aircraft gas turbine fuels in admixture with the hydrocarbons presently being used, such as JP–4.

When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactvity and heating values, the liquid products of this invention can be employed as fuel in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hyrocarbons. Extinction of the combustion process in the afterburner may also occur under these conditions of extreme altitude operation with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvement in the non-afterburning performance of a gas turbine-afterburner combination is also possible because the high chemical reactivity of the products of this invention eliminates the need of flameholding devices within the combustion zone of the afterburner. When employed in the afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substituted for hydrocarbon fuels and used in the established manner.

We claim:

1. A method for the preparation of an organoboron alcohol compound useful as a fuel which includes reacting successively with a material selected from the class consisting of alkali metal alkyls and alkali metal aryls, a 1,2-alkylene oxide, and water, a compound of the class $RR'B_{10}H_8$ ($CR''CR'''$) wherein R and R' are each selected from the class consisting of hydrogen and an alkyl radical containing from one to five carbon atoms, wherein R'' and R''' are each selected from the class consisting of hydrogen, an alkyl radical and a monoalkenyl hydrocarbon radical, at least one of R'' and R''' being hydrogen, and the total number of carbon atoms in R'' and R''' taken together not exceeding eight, the ratio of reactants being in the range of 0.1 to 10 moles of the said material per mole of said compound, 0.1 to 20 moles of 1,2-alkylene oxide per mole of said compound, and 0.1 to 20 moles of water per mole of said compound.

2. The method of claim 1 wherein the said material is an alkali metal alkyl.

3. The method of claim 2 wherein the alkali metal alkyl is a lithium alkyl.

4. The method of claim 2 wherein the alkali metal alkyl is n-butyl lithium.

5. The method of claim 1 wherein said compound is $B_{10}H_{10}$ (CHCH).

6. The method of claim 1 wherein the 1,2-alkylene oxide is ethylene oxide.

7. The method of claim 2 wherein the said compound is $B_{10}H_{10}$ (CHCH) wherein the alkali metal alkyl is n-butyl lithium, and wherein the 1,2-alkylene oxide is ethylene oxide.

No references cited.